United States Patent
Aoyama et al.

(10) Patent No.: US 7,373,688 B2
(45) Date of Patent: May 20, 2008

(54) WIPER BLADE PROVIDED WITH DETACHABLE BLADE RUBBER AND WIPER SYSTEM HAVING THE SAME

(75) Inventors: Toshiharu Aoyama, Toyohashi (JP); Naoki Torii, Toyohashi (JP); Shigeyuki Kobayashi, Kosai (JP); Yoshimasa Houjyo, Nishio (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 785 days.

(21) Appl. No.: 10/730,089

(22) Filed: Dec. 9, 2003

(65) Prior Publication Data
US 2004/0111820 A1  Jun. 17, 2004

(30) Foreign Application Priority Data
Dec. 13, 2002 (JP) ............................. 2002-362549
Dec. 13, 2002 (JP) ............................. 2002-362550

(51) Int. Cl.
*B60S 1/38* (2006.01)
(52) U.S. Cl. ................ 15/250.201; 15/250.43
(58) Field of Classification Search .......... 15/250.201, 15/250.43, 250.361, 250.32, 250.48, 250.451, 15/250.452, 250.453, 250.44
See application file for complete search history.

(56) References Cited

U.S. PATENT DOCUMENTS

| | | | |
|---|---|---|---|
| 3,021,549 A * | 2/1962 | O'Shei | ................... 15/250.46 |
| 3,938,719 A | 2/1976 | Carlton | |
| 4,570,284 A * | 2/1986 | Verton | ................... 15/250.201 |
| 5,558,260 A | 9/1996 | Reichert | |
| 6,266,843 B1 | 7/2001 | Doman et al. | |
| 6,292,974 B1 | 9/2001 | Merkel et al. | |
| 6,293,450 B1 | 9/2001 | Aron | |
| 6,295,690 B1 | 10/2001 | Merkel et al. | |
| 6,484,914 B1 | 11/2002 | Willey | |
| 6,491,193 B2 | 12/2002 | Dudek et al. | |
| 6,523,218 B1 | 2/2003 | Kotlarski | |
| 6,836,926 B1 * | 1/2005 | De Block | ................. 15/250.43 |
| 6,944,905 B2 | 9/2005 | De Block et al. | |

(Continued)

FOREIGN PATENT DOCUMENTS

DE          2313939          3/1973

(Continued)

OTHER PUBLICATIONS

Search Report from French Patent Office issued on Apr. 7, 2006 for the corresponding French patent application No. FR0314641.

(Continued)

*Primary Examiner*—Gary K Graham
(74) *Attorney, Agent, or Firm*—Posz Law Group, PLC

(57) ABSTRACT

A wiper blade of a wiper system of a vehicle includes a blade rubber, two backing plates, a holder and a resilient fin. The backing plates are received in backing grooves of the blade rubber. The holder is rotatably connected to a wiper arm of the wiper system and detachably holds the blade rubber, which has the backing plates. The resilient fin is connected to the holder and limits lifting of the wiper blade from a windshield surface of the vehicle when the vehicle is running.

23 Claims, 8 Drawing Sheets

U.S. PATENT DOCUMENTS

| | | |
|---|---|---|
| 2002/0000018 A1 | 1/2002 | Kotlarski et al. |
| 2003/0057242 A1 | 3/2003 | Schurr |
| 2003/0066854 A1 | 4/2003 | Heinrich et al. |
| 2003/0074763 A1 | 4/2003 | Egner-Walter et al. |
| 2005/0172443 A1 | 8/2005 | Genet et al. |

FOREIGN PATENT DOCUMENTS

| | | | |
|---|---|---|---|
| DE | 3339414 | * | 5/1985 |
| DE | 100 14 803 | | 10/2001 |
| DE | 10036 122 A1 | | 4/2002 |
| DE | 10057253 | * | 5/2002 |
| FR | 2594765 | * | 8/1987 |
| FR | 2 804 922 | | 8/2001 |
| GB | 2 106 775 | | 4/1983 |
| JP | U-H04-108470 | | 9/1992 |
| JP | A-07-186893 | | 7/1995 |
| WO | 00/34090 | * | 6/2000 |

OTHER PUBLICATIONS

Notification of Reason(s) for Refusal from Japanese Patent Office issued on Nov. 28, 2006 for the corresponding Japanese patent application No. 2002-362549.

Notification of Reason(s) for Refusal from Japanese Patent Office issued on Nov. 28, 2006 for the corresponding Japanese patent application No. 2002-362550.

* cited by examiner

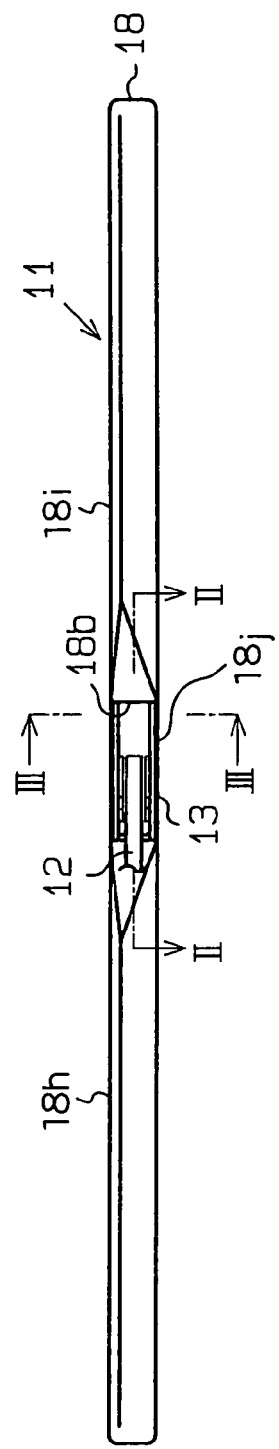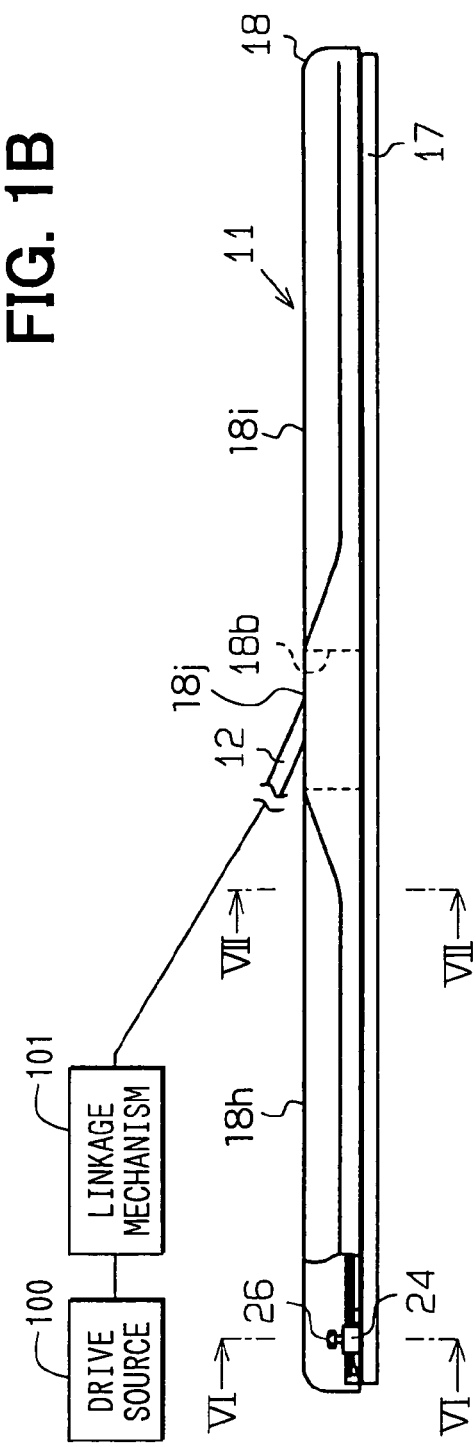

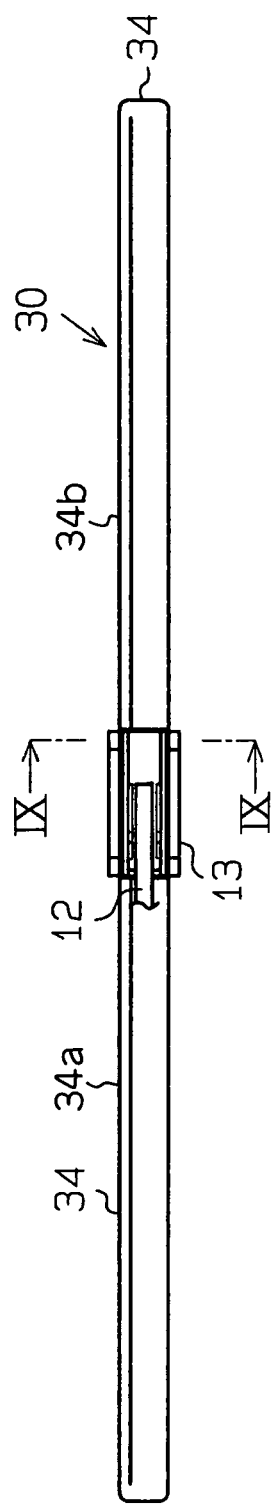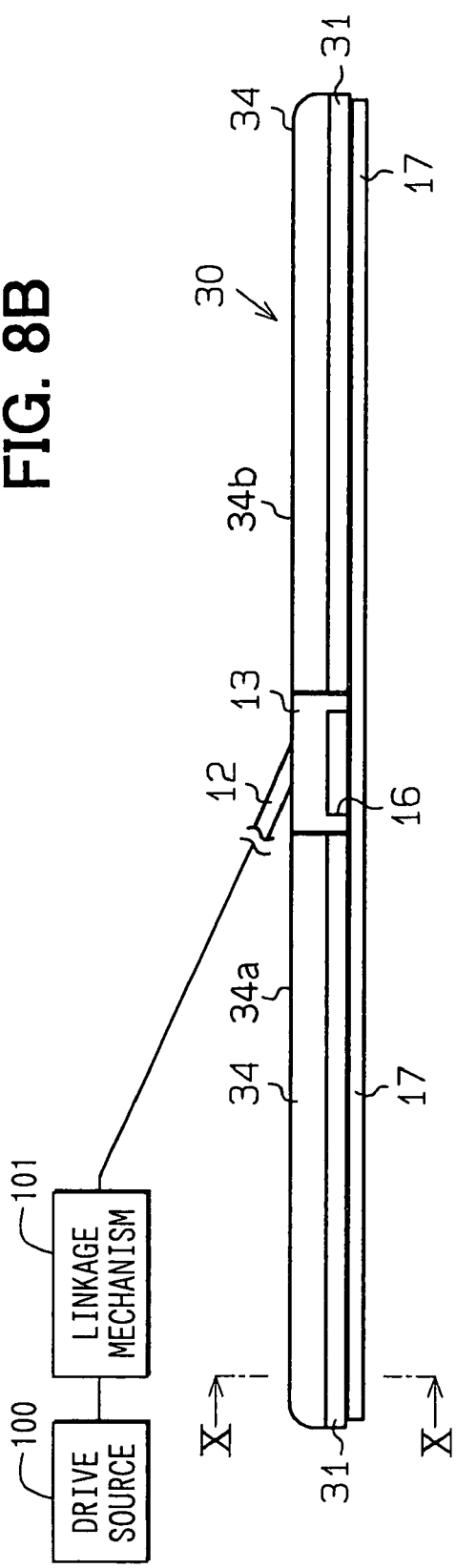

WIPER BLADE PROVIDED WITH DETACHABLE BLADE RUBBER AND WIPER SYSTEM HAVING THE SAME

CROSS REFERENCE TO RELATED APPLICATION

This application is based on and incorporates herein by reference Japanese Patent Application No. 2002-362549 filed on Dec. 13, 2002 and Japanese Patent Application No. 2002-362550 filed on Dec. 13, 2002.

BACKGROUND OF THE INVENTION

1. Field of the Invention

The present invention relates to a wiper blade and a wiper system having the same.

2. Description of Related Art

A wiper system that wipes a windshield of a vehicle uses a wiper blade, which can effectively wipe the windshield even when the windshield is a curved glass. Specifically, one such wiper blade includes a lever assembly, which includes a plurality of levers rotatably connected to a blade rubber. The blade rubber and backing plates are held by the lever assembly to spread urging force, which is applied from a wiper arm connected to the lever assembly, to the entire length of the blade rubber. Such a wiper blade is called as a tournament wiper blade and is widely used.

Apart from the tournament wiper blade, another type of wiper blade has been proposed in, for example, Japanese Unexamined Patent Publication No. 2002-531325 corresponding to U.S. Pat. No. 6,523,218. Here, backing plates, which are received in backing grooves of a blade rubber and have a predetermined rigidity, are curved into a predetermined curved shape that corresponds to a curvature of the windshield. Urging force of a wiper arm connected to the wiper blade is spread to the entire length of the blade rubber through the backing plates without using the levers.

Due to the absence of the levers, a height of the wiper blade measured in a direction perpendicular to the windshield surface is reduced to achieve a lower profile of the wiper blade in comparison to the tournament wiper blade. Because of the lower profile, such a wiper blade shows high performance at the time of driving the vehicle at the relatively high speed and thereby restrains lifting of the wiper blade from the windshield and generation of wind noise. Furthermore, such a wiper blade normally includes a fin to further improve the performance at the time of driving the vehicle at the relatively high speed.

In the wiper blade disclosed in the above-described Japanese Unexamined Patent Publication No. 2002-531325, the backing plates are received in the grooves of the blade rubber, and cuts are made along the length of the blade rubber. Securing claws of retainers are received in the cuts of the blade rubber to hold the backing plates in the grooves. Thus, these retainers, which are exposed at an exterior of the wiper blade, deteriorate an appearance of the wiper blade. Furthermore, the blade rubber and the fin are integrally molded. Thus, when the blade rubber is worn, the blade rubber and/or the backing plates need to be replaced together with the fin. As a result, the integrated blade rubber and fin cause an increase in replacement costs of the blade rubber.

Apart from the above disclosed wiper blade, there has been also proposed a wiper blade, in which a blade rubber is bonded to one side of a single backing plate by adhesive, and a fin is bonded to the other side of the backing plate by adhesive. In this case, it is difficult for an ordinary user to bond the blade rubber to the curved backing plate in an appropriate manner at the time of replacing the blade rubber. Thus, the blade rubber replaced by the ordinary user often cannot achieve good performance.

Another type of wiper blade has been proposed in, for example, German Patent No. 2313939. A blade rubber, which wipes the windshield, is made of a rubber material. A backing plate, which spreads urging force to the entire length of the blade rubber is received in the blade rubber. After long term of use, the blade rubber is worn, and the backing plate changes its shape. Thus, a wiping performance of the wiper blade is deteriorated, and the blade rubber needs to be replaced together with the backing plate. In the above-described German patent No. 2313939, notches are formed in the backing plate, and distal ends of hooks of a holder connected to a wiper arm are bent relative to the notches to securely engage the hooks of the holder with the notches of the backing plate and thereby to restrain longitudinal movement of the backing plate and the holder. Thus, at the time of removing the holder from the backing plate, a dedicated tool is required to deform the hooks, and the removal of the holder from the backing plate using such a tool is difficult. Furthermore, when the backing plate and the holder are removed, the hooks of the holder may be deformed inappropriately and are difficult to reinstall. This results in difficulties in the replacement of the blade rubber of the wiper blade.

SUMMARY OF THE INVENTION

The present invention addresses the above disadvantages. Thus, it is an objective of the present invention to provide a wiper blade, which has no lever assembly and allows easy replacement of its components at minimum costs. It is another objective of the present invention to provide a wiper system having such a wiper blade.

To achieve the objectives of the present invention, there is provided a wiper blade for a wiper system that wipes a wiping surface of a vehicle and includes a wiper arm rotatably connected to the wiper blade. The wiper blade includes a blade rubber, two backing plates, a holder and a resilient fin. The blade rubber wipes the wiping surface and includes two primary grooves. The primary grooves extend in a first direction parallel to a central axis of the wiper blade and are arranged in first and second lateral sides, respectively, of the blade rubber that are opposed to one another in a second direction, which is perpendicular to the first direction and generally parallel to the wiping surface. The backing plates extend in the first direction and are received in the primary grooves, respectively, of the blade rubber. The holder is rotatably connected to the wiper arm and detachably holds the blade rubber, which has the backing plates. The resilient fin extends in the first direction and is connected to the holder. The fin limits lifting of the wiper blade from the wiping surface when the vehicle is running.

To achieve the objectives of the present invention, there is also provided a wiper blade for a wiper system that wipes a wiping surface of a vehicle and includes a wiper arm rotatably connected to the wiper blade. The wiper blade includes a blade rubber, two backing plates and a holder. The blade rubber wipes the wiping surface and includes two primary grooves, two secondary grooves and at least one holding portion. The primary grooves extend in a first direction parallel to a central axis of the wiper blade and are arranged in first and second lateral sides, respectively, of the blade rubber that are opposed to one another in a second direction perpendicular to the first direction and generally parallel to the wiping surface. The secondary grooves extend in the first direction and are arranged in the first and second lateral sides, respectively, of the blade rubber. The backing plates extend in the first direction and are received in the primary grooves, respectively, of the blade rubber. The holder is rotatably connected to the wiper arm and detachably holds the blade rubber, which has the backing plates, wherein the holder includes at least one pair of claws, which are received in the secondary grooves, respectively, of the blade rubber. The at least one holding portion of the blade rubber engages with the holder to limit movement of the holder in the first direction.

To achieve the objectives of the present invention, there is also provided a wiper system having one of the above wiper blades.

BRIEF DESCRIPTION OF THE DRAWINGS

The invention, together with additional objectives, features and advantages thereof, will be best understood from the following description, the appended claims and the accompanying drawings in which:

FIG. 1A is a schematic plan view of a wiper blade according to a first embodiment of the present invention;

FIG. 1B is a front view of the wiper blade of FIG. 1A;

FIG. 8A is a schematic plan view of a wiper blade according to a second embodiment of the present invention;

FIG. 8B is a front view of the wiper blade of FIG. 8A;

DETAILED DESCRIPTION OF THE INVENTION

First Embodiment

A first embodiment of the present invention will be described with reference to the accompanying drawings.

With reference to FIGS. 1A and 1B, a wiper blade 11 of a wiper system according to a first embodiment of the present invention is rotatably connected to a wiper arm 12 and is urged by the wiper arm 12 against a windshield surface 27 (FIG. 7) to be wiped. The wiper system of the present embodiment includes at least one such wiper blade 11, at least one such wiper arm 12, a drive source (such as an electric motor) 100 and a linkage mechanism 101, which links between the drive source and the wiper arm 12. The windshield surface 27, which is wiped by the wiper blade 11, serves as a wiping surface of the present invention.

Figure 2:
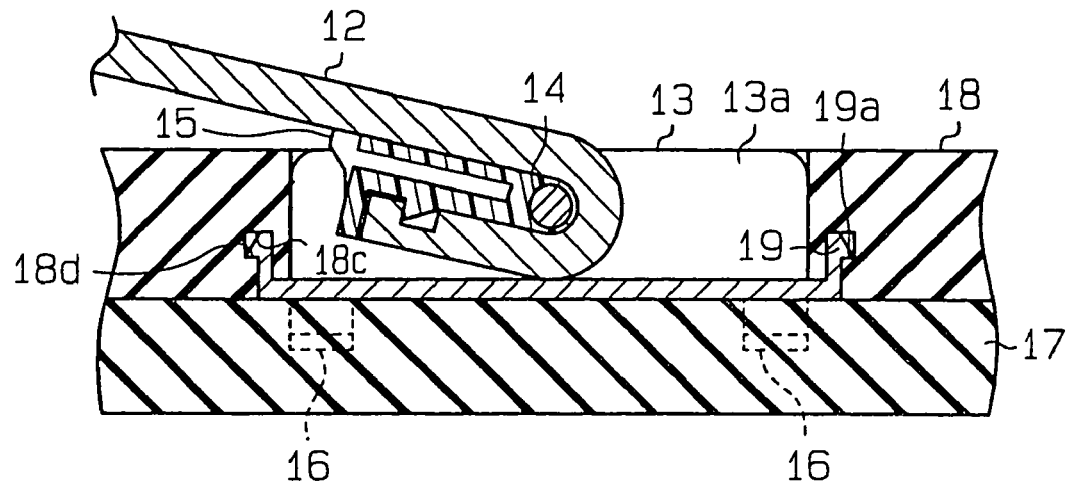
FIG. 2 is a partial cross sectional view along line II-II in FIG. 1A.

As shown in FIG. 2, a distal end of the wiper arm 12 is U-shaped, and a holder 13 is connected to the U-shaped distal end of the wiper arm 12. The holder 13 is made of a rigid material (e.g., a metal material or alternatively a rigid resin material) and has a connecting member 15, which is made of, for example, a resin material and is rotatably supported by a rotational shaft 14. A distal end of the wiper arm 12 is secured to the connecting member 15, and the holder 13 is rotated relative to the wiper arm 12.

The holder 13 includes a generally rectangular plate portion 13c and two lateral wall portions 13a, 13b. The wall portions 13a, 13b (only one is shown in FIG. 2) are connected to lateral edges, respectively, of the plate portion 13c and extend in a longitudinal direction (first direction) of the wiper blade 11, which is parallel to a central axis U (FIG. 5) of the wiper blade 11 (also serving as a central axis of the holder 13 and of a blade rubber 17 described below). The rotational shaft 14 is secured to a longitudinal center of the each wall portion 13a, 13b.

Each longitudinal end of the plate portion 13c of the holder 13 includes a pair of claws 16, which are symmetrically arranged with respect to the central axis U. Thus, two pairs (first and second pairs) of claws 16 are provided in the plate portion 13c. Each claw 16 is bent toward the central axis U in a transverse direction (second direction) of the wiper blade 11, which is perpendicular to the longitudinal direction of the wiper blade 11 and is generally parallel to the windshield surface 27 (FIG. 7) of a vehicle, to connect the holder 13 to the blade rubber 17.

As shown in FIG. 2, two engaging protrusions 19 are provided in the longitudinal ends of the plate portion 13c of the holder 13 to secure a fin (also called as a spoiler) 18, which is made of a resilient rubber material, to the holder 13. Each engaging protrusion 19 extends from the corresponding longitudinal end of the plate portion 13c at a transverse center of the plate portion 13c (i.e., a center of the plate portion 13c in the transverse direction of the wiper blade 11) toward a corresponding longitudinal end of the blade rubber 17 and is bent in a direction (upward direction in FIG. 2) away from a windshield surface side of the plate portion 13c. That is, the distal end of the engaging protrusion 19 projects to oppose the fin 18.

An anchoring projection 19a projects from the distal end of the engaging protrusion 19 in a direction, which is different from the projecting direction of the rest of the engaging protrusion 19 that projects from the plate portion 13c. In the present embodiment, the anchoring projection 19a is formed to project in the longitudinal direction of the wiper blade 11.

Figure 3:
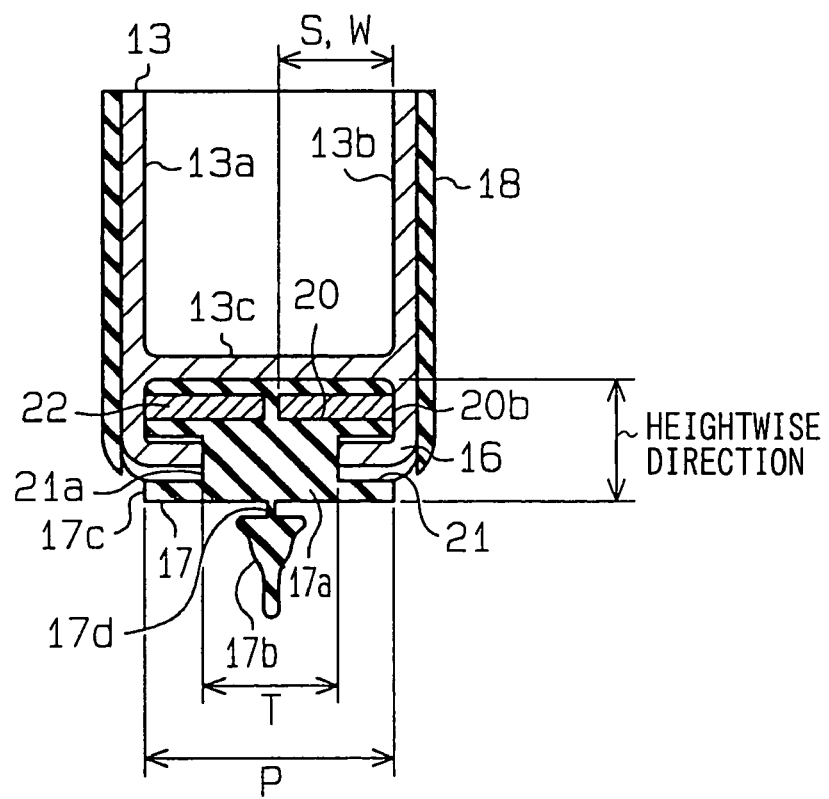
FIG. 3 is a cross sectional view along line III-III in FIG. 1A.

With reference to FIG. 3, the blade rubber 17, which is connected to the holder 13, extends in the longitudinal direction of the wiper blade 11 and is made of a rubber material. The blade rubber 17 has a connecting body 17a and a wiping lip 17b. A backing groove (serving as a primary groove) 20 and a holder groove (serving as a secondary groove) 21 are formed in each of outer lateral surfaces (first and second lateral sides of the present invention) 17c of the connecting body 17a, which are opposed in the transverse direction of the wiper blade 11. The backing groove 20 is formed on one side (top side in FIG. 3) of the holder groove 21, which is opposite from the wiping lip 17b. More specifically, as shown in FIG. 3, a cross sectional area of the connecting body 17a is necked at two vertical points in FIG. 3 to form the backing grooves 20 and the holder grooves 21. The wiping lip 17b has a generally triangular cross section. Furthermore, the wiping lip 17b is connected to the connecting body 17*a* through a neck portion 17*d* in a manner that allows tilt of the wiping lip 17*b* relative to the connecting body 17*a*.

Figure 4:
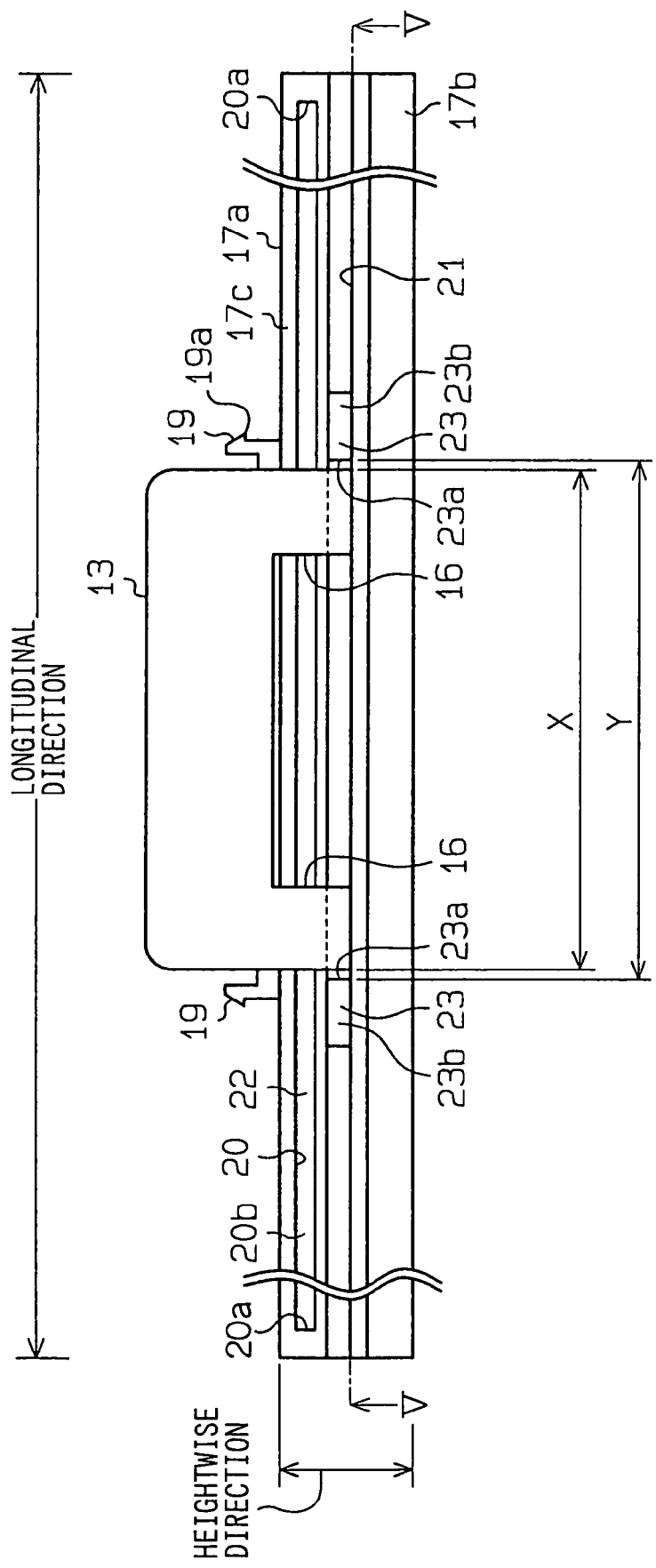
FIG. 4 is a partial enlarged schematic view of the wiper blade after removal of a fin.

FIG. 4 is a frontal view of the wiper blade 11 without the fin 18.

Each backing groove 20 extends in the longitudinal direction of the wiper blade 11. A backing plate 22 is fitted into each backing groove 20. Each backing groove 20 has limiting surfaces 20*a*, which are arranged at opposed longitudinal ends of the backing groove 20 to limit movement of the backing plate 22 in the longitudinal direction of the wiper blade 11. The backing plate 22 is entirely fitted into the corresponding backing groove 20. More specifically, with reference to FIG. 3, a width W of each backing plate 22 is equal to or less than a depth S of the backing groove 20.

The backing plate 22, which is fitted into the backing groove 20, is shaped into an elongated plate and is made of a metal material, which has spring characteristics. The backing plate 22 is curved to correspond with a curvature of the windshield surface 27 to be wiped by the wiper blade 11. The backing plate 22 is curved to have a curvature, which is greater than a curvature of the wipe surface of the wiper blade 11. Thus, when the backing plate 22 is fitted into the backing groove 20, the wiper blade 11 is deformed and is curved to correspond with a shape of the backing plate 22. The backing plate 22 has a predetermined rigidity and spring characteristics, so that when urging force is applied to the wiper blade 11 through the wiper arm 12 at the time of wiping the windshield surface 27, the wiper blade 11 is resiliently deformed in conformity with the curvature of the windshield surface 27.

Each holder groove 21 shown in FIG. 4 extends in the longitudinal direction of the wiper blade 11. Furthermore, as shown in FIG. 3, the holder groove 21 is located between the backing groove 20 and the wiping lip 17*b* in a heightwise direction (third direction) of the wiper blade 11, which is generally perpendicular to the windshield surface 27. Each claw 16 is shaped in conformity with the shape of the corresponding holder groove 21 to allow insertion of the claw 16 into the holder groove 21. More specifically, as shown in FIG. 3, the two opposed claws 16 of each pair are bent at right angles at the height of the holder grooves 21. A distance T between the opposed claws 16 is smaller than a distance P (i.e., a distance measured in the transverse direction of the wiper blade 11) between the opposed outer lateral surfaces 17*c* of the connecting body 17*a*.

When the claws 16 are received in the corresponding holder grooves 21, the holder 13 is engaged with the blade rubber 17 through the claws 16, so that the blade rubber 17 is detachably held by the holder 13. Furthermore, when the claws 16 are received in the corresponding holder grooves 21, openings 20*b* of the backing grooves 20 (i.e., openings of the backing grooves 20 in the transverse direction of the wiper blade 11) are partially closed by the corresponding claws 16. That is, the claws 16 serve as limiting elements, which limit or prevent removal of the backing plates 22 from the corresponding backing grooves 20.

Figure 5:
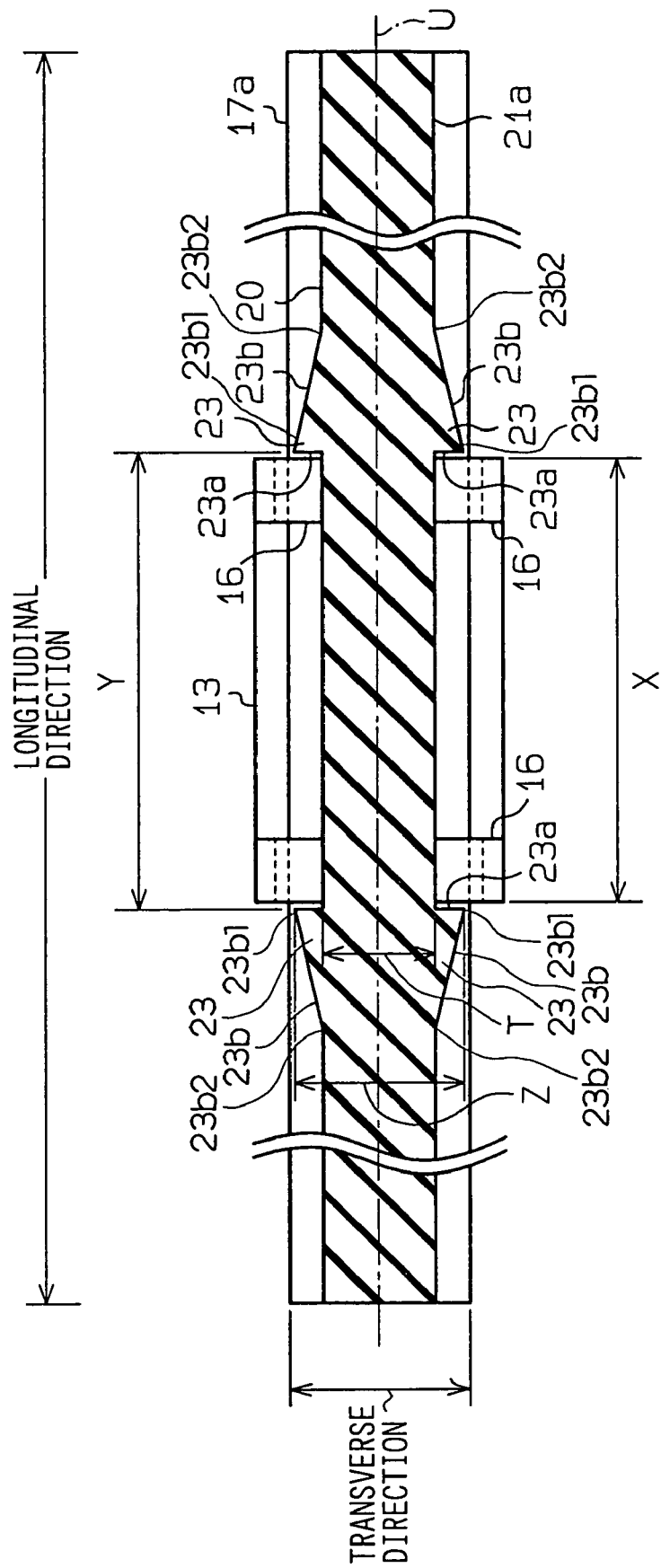
FIG. 5 is a cross sectional view along line V-V in FIG. 4.

As shown in FIGS. 4 and 5, two pairs (first and second pairs) of holding portions 23 are formed in the holding grooves 21. The two holding portions 23 of each pair are provided in the two holding grooves 21, respectively. Furthermore, the first pair of holding portions 23 is spaced from the second pair of holding portions 23 in the longitudinal direction of the wiper blade 11, such that the pairs of claws 16 are positioned between the first pair of holding portions 23 and the second pair of holding portions 23. Each holding portion 23 protrudes from a base 21*a* of the corresponding holder groove 21 (i.e., a surface of the holder groove 21, which extends in the heightwise direction of the wiper blade 11 in FIG. 3). Each holding portion 23 is located between the corresponding claw 16 and a corresponding one of the opposed longitudinal ends of the blade rubber 17. Specifically, a distance Y between the two holding portions 23 of each pair, which are located in the corresponding holder grooves 21 and are spaced in the longitudinal direction of the wiper blade 11, is slightly greater than a distance (i.e., a longitudinal length of a main body of the holder 13) X between an outer longitudinal end surface of one of the two claws 16, which are longitudinally separated, and an outer longitudinal end surface of the other one of the two claws 16 measured in the longitudinal direction of the wiper blade 11.

A stop surface 23*a*, which limits movement of the corresponding claw 16 in the longitudinal direction of the wiper blade 11, is formed in an inner longitudinal end surface of each holding portion 23. The stop surface 23*a* is engaged with the corresponding claw 16 in the longitudinal direction of the wiper blade 11. Specifically, as shown in FIG. 5, the holding portions 23 are arranged in the holder grooves 21 in such a manner that a distance Z between the two holding portions 23 measured in the transverse direction of the wiper blade 11, i.e., a distance between an outermost part of one of the two holding portions 23 and an outermost part of the other one of the two holding portions 23 in the transverse direction of the wiper blade 11 is greater than a distance T between an inner distal end of one of the two claws 16 and an inner distal end of the other one of the two claws 16. Since the holding portions 23 are arranged adjacent the longitudinal ends of the holder 13, the stop surfaces 23*a* of the longitudinally spaced holding portions 23 can engage the corresponding claws 16 of the holder 13 in the longitudinal direction of the wiper blade 11 to position the holder 13 between the longitudinally spaced holding portions 23. When the holder 13 is positioned in the longitudinal center of the blade rubber 17, each stop surface 23*a* of the blade rubber 17 is held in a corresponding position of the holder 13, at which the outer longitudinal end surface of the corresponding claw 16 is engaged with the stop surface 23*a*. Thus, the holder 13 is securely held in the longitudinal center of the blade rubber 17 by the stop surfaces 23*a*.

A slope 23*b* is formed in each of the holding portions 23 in such a manner that the slope 23*b* extends from the outer longitudinal end of the holding portion 23 toward the stop surface 23*a*. The slope 23*b* is formed as an inclined surface, which extends from the outer longitudinal end of the corresponding holding portion 23 toward the stop surface 23*a*. More specifically, a distance between the holder 13 (more specifically, the corresponding claw 16 of the holder 13) and a first end 23*b*1 of the slope 23*b* of each holding portion 23 is smaller than a distance between the holder 13 and a second end 23*b*2 of the slope 23*b* of the holding portion 23. Furthermore, a distance between the central axis U of the blade rubber 17 and the first end 23*b*1 of the slope 23*b* of each holding portion 23 is greater than a distance between the central axis U of the blade rubber 17 and the second end 23*b*2 of the slope 23 of the holding portion 23. The slope 23*b* is made of a resiliently deformable rubber material. Thus, when the holder 13 is moved from the longitudinal end of the blade rubber 17 toward the center of the blade rubber 17, the claws 16 can smoothly and gradually move beyond the slopes 23*b* and the stop surfaces 23*a* of the corresponding holding portions 23.

Figure 6:
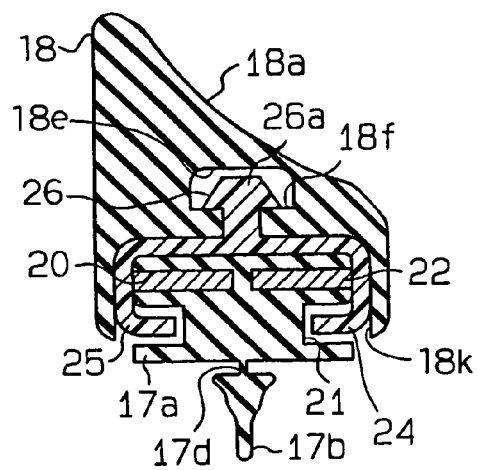
FIG. 6 is a cross sectional view along line VI-VI in FIG. 1B.

Furthermore, as shown in FIG. 1B, a support member 24 is provided in each of the longitudinal ends of the blade rubber 17. In FIG. 1B, only one support member 24 is shown at the one end of the blade rubber 17. As shown in FIG. 6, each support member 24 has two symmetrically arranged claws 25 for holding the blade rubber 17 and for holding the fin 18 relative to the blade rubber 17. The claws 25 of the support member 24 are bent inwardly in the transverse direction of the wiper blade 11, to connect the blade rubber 17 to the fin 18. Similar to the holder 13, the claws 25 of the support member 24 are received in the corresponding holder grooves 21 at the corresponding longitudinal end of the blade rubber 17. When the claws 25 of the support members 24 are received in the holder grooves 21, the blade rubber 17 can be moved relative to the claws 25 of the support members 24 and the claws 16 of the holder 13 in the longitudinal direction of the wiper blade 11. At this time, the support members 24 and the holder 13 support not only the blade rubber 17 but also the backing plates 22. Thus, the support members 24 and the holder 13 limit removal of the backing plates 22 from the corresponding backing grooves 20 in the transverse direction of the wiper blade 11.

Each support member 24 further includes an engaging protrusion 26, which projects from a portion of the support member 24, which is engaged with the connecting body 17a of the blade rubber 17, in a direction away from the claws 25. More specifically, the engaging protrusion 26 projects on one side (a top side in FIG. 6) of the support member 24, which is opposite from the wiping lip 17b, and is opposed to the fin 18. An anchoring projection 26a is formed in a distal end of the engaging protrusion 26 in such a manner that the anchoring projection 26a projects in a direction that is different from the projecting direction of the rest of the engaging protrusion 26.

Furthermore, as shown in FIGS. 1A and 1B, the holder 13 and the support members 24 hold the fin 18, which covers substantially the entire connecting body 17a, relative to the blade rubber 17.

Figure 7:
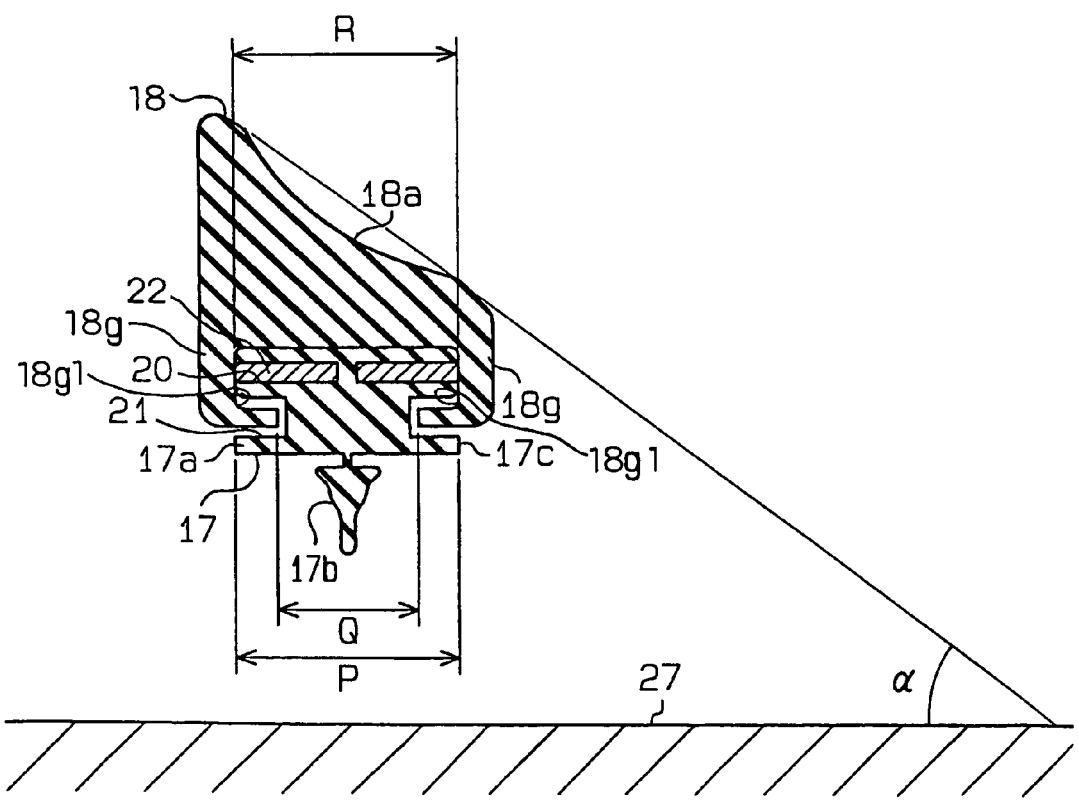
FIG. 7 is a cross sectional view along line VII-VII in FIG. 1B.

As shown in FIG. 7, the fin 18 has a generally triangular cross section. Furthermore, the fin 18 has a sloped concave surface 18a, which defines an acute angle relative to the windshield surface 27. With this arrangement, the fin 18 spreads a drag, which is generated upon application of wind to the running vehicle and to the wiper blade 11, and directly applies a portion of the drag to the blade rubber 17 to restrain lifting of the blade rubber 17 from the windshield surface 27. A receiving hole 18b (FIGS. 1A and 1B), which receives the holder 13, is formed in the longitudinal center of the fin 18. The fin 18 is assembled to receive the holder 13 in the receiving hole 18b. Specifically, the fin 18 includes fin sections 18h, 18i and a cover portion 18j. The fin sections 18h, 18i are arranged on opposite sides of the holder 13 in the longitudinal direction of the wiper blade 11, and the cover portion 18j covers the lateral walls of the holder 13 and connects between the fin sections 18h, 18i.

Furthermore, as shown in FIG. 2, the fin 18 includes two engaging holes 18c, into which the engaging protrusions 19 are respectively inserted. The engaging holes 18c are symmetrically arranged at longitudinal ends of the receiving hole 18b in consistent with the installation position of the holder 13 to the fin 18. An opening of each engaging hole 18c is narrowed to correspond with the shape of the corresponding engaging protrusion 19. Furthermore, a receiving portion 18d is formed in an interior of the engaging hole 18c to engage with the corresponding anchoring projection 19a of the engaging protrusion 19. Thus, the anchoring projection 19a of the engaging protrusion 19 is securely engaged with the fin 18 to limit and resist removal of the fin 18 from the holder 13. As a result, the fin 18 is secured to the holder 13. Furthermore, the fin 18 is made of the resiliently deformable rubber and thus can be smoothly engaged with the anchoring projections 19a even when the anchoring projections 19a are inserted through the narrow openings of the engaging holes 18c.

Furthermore, two connecting holes 18e are formed at the longitudinal ends of the fin 18 to engage with the engaging protrusions 26, respectively, of the support members 24. An opening of the connecting hole 18e is narrowed to conform with a shape of the corresponding engaging protrusion 26. A receiving portion 18f is formed in an interior of the connecting hole 18e to engage with the anchoring projection 26a of the engaging protrusion 26. Thus, in the interior of each connecting hole 18e, the anchoring projection 26a of the corresponding engaging protrusion 26 can securely engage with the fin 18. As a result, the support member 24 can securely engage with the fin 18.

Furthermore, as shown in FIG. 7, the fin 18 includes claws 18g, which serve as clamping portions and engage with the blade rubber 17. The claws 18g are symmetrically arranged with respect to the central axis U (FIG. 5) along the length of the fin 18. A distal end of each claw 18g is bent inwardly and is insertable into the corresponding holder groove 21. Specifically, the two opposed claws 18g are bent at right angles at the height of the holder grooves 21, as shown in FIG. 7. However, it should be noted that longitudinal portions of each claw 18g, which are transversely opposed to the claws 16 of the holder 13 and the claws 25 of the support members 24, are not bent inwardly to avoid interference with the insertion of the claws 16 and the claws 25 into the corresponding holder groove 21 of the blade rubber 17, as shown in FIGS. 3 and 6. A distance Q between the distal end of one of the claws 18g and the distal end of the other one of the claws 18g is smaller than the distance P (i.e., the distance in the transverse direction of the wiper blade 11) between the opposed outer lateral surfaces 17c of the connecting body 17a. With this arrangement, when the distal end of each claw 18g is inserted into the holder groove 21, the distal end of the claw 18g is engaged with blade rubber 17. Thus, the fin 18 is securely engaged with the blade rubber 17.

A distance R between opposed inner lateral surfaces 18g1 of the claws 18g in the transverse direction of the wiper blade 11 is slightly smaller than the distance P between the opposed outer lateral surfaces 17c of the connecting body 17a. Thus, when the distal ends of the claws 18g are inserted into the holder grooves 21, a portion of the connecting body 17a, which is located on the side of the holder grooves 21 opposite from the wiping lip 17b, is covered by the claws 18g of the fin 18. As a result, the claws 18g restrain removal of the backing plates 22 received in the backing grooves 20.

Next, a way of installing the blade rubber 17 to the holder 13 and the fin 18 will be described.

First, the holder 13 and the fin 18 are positioned relative to each other such that the engaging protrusions 19 of the holder 13 are aligned with the engaging holes 18c of the fin 18. Then, the engaging protrusions 19 of the holder 13 are fitted into the engaging holes 18c of the fin 18, and the holder 13 is received in the receiving hole 18b of the fin 18, so that the fin 18 is secured to the holder 13. At this time, the anchoring projections 19a are engaged with the receiving portions 18d. Thus, the fin 18 is effectively secured to the holder 13.

Next, the support members 24 and the fin 18 are positioned relative to each other such that the engaging protrusions 26 of the support members 24 are aligned with the connecting holes 18e of the fin 18. Then, the engaging protrusions 26 of the support members 24 are fitted into the connecting holes 18*e* of the fin 18, and thus the support members 24 are connected to the fin 18. At this time, the anchoring projections 26*a* are engaged with the receiving portions 18*f*. Thus, the support members 24 are effectively secured to the fin 18.

Then, the backing plates 22 are inserted into the backing grooves 20 through the openings 20*b* of the blade rubber 17. The blade rubber 17 is moved relative to the fin 18, to which the holder 13 and the support member 24 are secured, in the longitudinal direction of the wiper blade 11 from the end of the fin 18.

At this time, the longitudinal end of the blade rubber 17 is moved relative to the fin 18 in the longitudinal direction of the wiper blade 11, so that the claws 16 of the holder 13, the claws 25 of the support members 24 and the claws 18*g* of the fin 18 are received in the holder grooves 21 of the blade rubber 17.

When the blade rubber 17 is moved relative to the fin 18, to which the holder 13 and the support members 24 are connected, the claws 25 of the first encountered one of the support members 24 start to climb over the slopes 23*b* of the holding portions 23 of the first encountered pair. Then, when the blade rubber 17 is moved further, the claws 25 of the support member 24 are moved further relative to the slopes 23*b* in the longitudinal direction of the wiper blade 11. At this stage, a transverse size (also referred to as a width measured in the transverse direction of the wiper blade 11) of a corresponding portion of the connecting body 17*a*, which is engaged with the claws 25 of the support member 24, is reduced as the blade rubber 17 is moved further to compress the connecting body 17*a* in the transverse direction. Also, at this stage, a pressure applied from the claws 25 of the support member 24 to the connecting body 17*a* is increased. Since the blade rubber 17 is made of the resiliently deformable rubber, the blade rubber 17 is resiliently deformed in proportional to the pressure applied from the claws 25 of the support member 24. Thus, the support member 24 smoothly passes the slopes 23*b* beyond the stop surfaces 23*a* of the holding portions 23. When the claws 25 of the support member 24 pass the stop surfaces 23*a* of the holding portions 23, the blade rubber 17 returns to its original shape. Thereafter, when the blade rubber 17 is moved further in the longitudinal direction of the wiper blade 11, the stop surfaces 23*a* of the next holding portions 23 are engaged with the claws 25 of the support member 24. However, when pressure is kept applied from the claws 25 of the support member 24 to the stop surfaces 23*a* of the holding portions 23, the stop surfaces 23*a* of the holding portions 23 are resiliently deformed. Then, when the blade rubber 17 is kept moved in the longitudinal direction of the wiper blade 11, the claws 25 can easily pass the stop surfaces 23*a* of the holding portions 23.

Furthermore, similar to the claws 25 of the support member 24, when the blade rubber 17 is moved in the longitudinal direction of the wiper blade 11, the claws 16 of the holder 13 also climb the slopes 23*b* of the first encountered holding portions 23 and pass the holding portions 23. Similarly, the next claws 16 of the holder 13 also climb the slopes 23*b* of the first encountered holding portions 23 and pass the first encountered holding portions 23.

When the holder 13 is placed between the longitudinally spaced holding portions 23 formed in the holder grooves 21 of the blade rubber 17, the longitudinal movement of the blade rubber 17 in the longitudinal direction of the wiper blade 11 is limited. When the longitudinal movement of the blade rubber 17 relative to the holder 13 is stopped at this point, the holder 13 is positioned in the longitudinal center of the blade rubber 17. Furthermore, since the holder 13 is connected to the longitudinal center of the fin 18, the longitudinal center of the fin 18 coincides with the longitudinal center of the blade rubber 17, and the blade rubber 17 is connected to the fin 18.

The backing grooves 20 are located between the holder grooves 21 and the holder 13, the support members 24 and the fin 18. Thus, each claw 16 of the holder 13, each claw 25 of each support member 24 and each claw 18*g* of the fin 18 close the opening 20*b* of the corresponding backing groove 20. Thus, each backing plate 22 fitted into the corresponding backing groove 20 is held by the corresponding claws 16 of the holder 13, the corresponding claw 25 of each support member 24 and the corresponding claw 18*g* of the fin 18. Here, longitudinal movement of the backing plate 22 in the longitudinal direction of the wiper blade 11 is limited by engagement between the backing plate 22 and the limiting surfaces 20*a*, which are arranged at the opposed longitudinal ends of the backing groove 20. Transverse movement of the backing plate 22 in the transverse direction of the wiper blade 11 and heightwise movement of the backing plate 22 in the heightwise direction of the wiper blade 11 are limited by the walls of the corresponding backing groove 20, the corresponding claws 16 of the holder 13, the corresponding claw 25 of each support member 24 and the corresponding claw 18*g* of the fin 18.

Next, a way of removing the blade rubber 17 and the backing plates 22 from the holder 13 and the fin 18 will be described.

First, pressure is applied to the blade rubber 17 at one end of the fin 18 such that the claws 18*g* of the fin 18, the claws 25 of the support members 24 and the claws 16 of the holder 13 are removed from the holder grooves 21 of the blade rubber 17. Thus, the stop surfaces 23*a* of the holding portions 23 of the blade rubber 17 are resiliently deformed by the claws 16 of the holder 13 and the claws 25 of the support members 24, so that the claws 16 of the holder 13 and the claws 25 of the support member 24 are moved beyond the holding portions 23. Thus, the longitudinal movement of the blade rubber 17 relative to the fin 18, the support members 24 and the holder 13 becomes possible. As a result, the blade rubber 17 can be relatively easily removed together with the backing plates 22.

The first embodiment provides the following advantages.

(1) The engaging protrusions 19 are provided in the holder 13 and are fitted into the engaging holes 18*c* of the fin 18 to secure the fin 18 relative to the holder 13. Furthermore, the engaging protrusions 26 provided in the support members 24 are fitted into the connecting holes 18*e* of the fin 18 to secure the support members 24 relative to the fin 18. The connecting body 17*a* of the blade rubber 17 is connected to the fin 18 through the holder 13 and the support members 24, and the fin 18 is supported by the holder 13 and the support members 24 relative to the blade rubber 17. Thus, direct bonding of the fin 18 to the blade rubber 17 is not required, and installation and detachment of the blade rubber 17 relative to the fin 18 can be easily performed. In this way, the blade rubber 17 can be easily removed from the fin 18, the holder 13 and the support members 24, so that the worn blade rubber 17 and the worn backing plates 22 can be easily replaced. Furthermore, at the time of installing the blade rubber 17, the above removal procedure is reversed. Thus, the claws 18*g* of the fin 18, the claws 25 of the support members 24 and the claws 16 of the holder 13 are inserted into and are moved along the holder grooves 21. In this way, the blade rubber 17 is guided by the claws 16, 25 and the claws 18*g* and are appropriately connected to the fin 18 in the longitudinal direction of the wiper blade 11. Therefore, ordinary users can easily install the blade rubber 17 to the fin 18 to maintain good wiping performance of the blade rubber 17.

(2) The fin 18, which is connected to the blade rubber 17 through the holder 13 and the support members 24, substantially covers an entire top portion of the blade rubber 17. Thus, a good appearance of the wiper blade 11 can be achieved. Furthermore, the blade rubber 17 is secured to the fin 18 through the holder 13 and the support members 24. As a result, it is not required to provide components, such as a connecting element, which is placed in an exterior of the fin 18 and connects the blade rubber 17 to the fin 18. Furthermore, it is not required to form a cut in the exterior of the fin 18 to secure such a connecting element to the fin 18. Therefore, a good appearance of the wiper blade 11 can be achieved. Also, the design quality of the wiper blade 11 can be improved. Furthermore, it is not required to provide a projection(s) or a recess(s) for installing such a connecting element to the exterior of the fin 18 to secure the blade rubber 17 to the fin 18. Thus, it is possible to improve performance of the wiper blade 11 at the time of driving the vehicle at the relatively high speed, thereby reducing wind resistance and wind noise.

(3) The anchoring projection 19a is provided in each engaging protrusion 19 of the holder 13, and the anchoring projection 26a is provided in the engaging protrusion 26 of each support member 24. Furthermore, the receiving portion 18d, which is engaged with the anchoring projection 19a of the corresponding engaging protrusion 19, is formed in each engaging hole 18c of the fin 18, and the receiving portion 18f, which is engaged with the anchoring projection 26a of the corresponding engaging protrusion 26, is formed in each connecting hole 18e of the fin 18. With this arrangement, when the engaging protrusions 19 of the holder 13 are fitted into the engaging holes 18c of the fin 18, and the engaging protrusions 26 of the support members 24 are fitted into the connecting holes 18e of the fin 18, the fin 18 is securely engaged with the holder 13 and the support members 24 to prevent inadvertent removal of the fin 18 from the holder 13 and the support members 24.

(4) The claws 18g of the fin 18 are inserted into the holder grooves 21 and cover the outer lateral surfaces 17c of the connecting body 17a. Thus, the openings 20b of the backing grooves 20 are covered by the fin 18. As a result, the backing plates 22 are not externally exposed, and thus it is possible to provide a good appearance of the wiper blade 11 without requiring painting of the metal backing plates 22 with a color (generally black color) that coincides with a color of the blade rubber 17. Furthermore, since the openings 20b of the backing grooves 20 are covered by the fin 18, edges of the backing plates 22 are protected by the fin 18.

(5) The fin 18 is supported relative to the blade rubber 17 only by the holder 13 and the support members 24 and is not entirely, firmly secured to the blade rubber 17 by, for example, adhesive. Thus, when the blade rubber 17 is curved, the fin 18 can be easily deformed to coincide with the curved shape of the blade rubber 17. Therefore, even when a curvature of the fin 18 is different from a curvature of the blade rubber 17, the fin 18 does not interfere with the curved shape of the blade rubber 17, thereby aiding improvement of urging performance of the blade rubber 17 against the windshield surface 27. Also, when the fin 18 is entirely, firmly secured to the blade rubber 17 by, for example, adhesive, wrinkles can be formed on the fin 18 and the blade rubber 17. However, since the fin 18 is supported relative to the blade rubber 17 only by the holder 13 and the support members 24, the formation of the wrinkles is restrained. Therefore, it is possible to achieve a good appearance of the wiper blade 11.

Second Embodiment

A second embodiment of the present invention will be described with reference to FIGS. 8A to 10. In the present embodiment, components similar to those discussed in the first embodiment will be indicated by the same numerals and will not be described further.

With reference to FIGS. 8A and 8B, a rail 31, which serves as a holding member, is provided to cover the connecting body 17a of the blade rubber 17. The rail 31 extends in the longitudinal direction of the blade rubber 17. The rail 31 is made of a resiliently deformable resin material and can be deformed to coincide with the curved shape of the backing plate 22.

Figure 9:
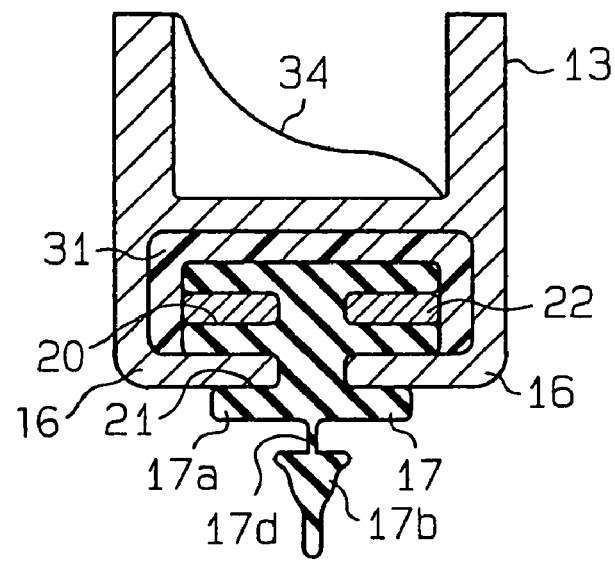
FIG. 9 is a cross sectional view along line IX-IX in FIG. 8A.

As shown in FIGS. 8A and 8B, the holder 13 is secured to the longitudinal center of the rail 31. As shown in FIG. 9, the holder 13 is connected to the rain 31 and the blade rubber 17 through the claws 16 of the holder 13. In the area where the claws 16 are formed, the rail 31 covers only a portion (an upper portion in FIG. 9) of the connecting body 17a, which is located on one side of the holder grooves 21 opposite from the wiping lip 17b. The claws 16 of the holder 13 cover the rail 31 at outside of the rain 31. The distal ends of the claws 16 of the holder 13 are inserted into the holder grooves 21 and hold the blade rubber 17.

Figure 10:
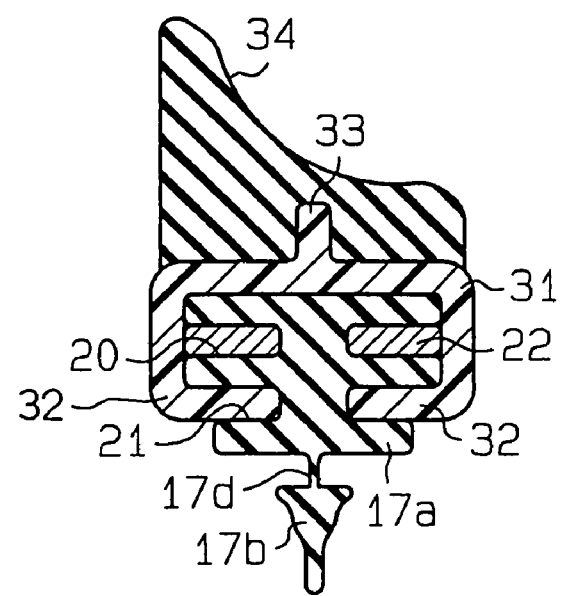
FIG. 10 is a cross sectional view along line X-X in FIG. 8B.

Furthermore, as shown in FIG. 10, the rail 31 includes two claws 32 to connect the rail 31 to the blade rubber 17. The claws 32 extend in the longitudinal direction of the wiper blade 30 from one end of the blade rubber 17 to the other end of the blade rubber 17 except a portion of the rail 31 where the holder 13 is connected to the rail 31. The claws 32 of the rain 31 are bent symmetrically with respect to the central axis of the rail 31 toward the central axis of the rail 31 in the transverse direction of the wiper blade 30. The claws 32 of the rail 31 are not formed in the portion of the rail 31 where the holder 13 is connected to the rail 31 to avoid interference of the claws 32 with the claws 16 of the holder 13. When the distal ends of the claws 32 of the rail 31 are inserted into the holder grooves 21, the blade rubber 17 is supported by the rail 31.

The rail 31 further includes positioning portions 33, which are provided in predetermined positions of the rail 31 to position the fin 34 relative to the rail 31. Each positioning portion 33 projects from the rail 31 on the side opposite from the wiping lip 17b. The fin 34 is bonded to the rail 31 by adhesive at the position of the positioning portion 33 and is thus secured to the rail 31. As shown in FIGS. 8A and 8B, the fin 34 of the second embodiment is divided into two fin sections 34a, 34b at the holder 13. The fin sections 34a, 34b of the second embodiment are connected to the rail 31.

Next, replacement of the wiper blade 30 will be described.

First, a way of installing the fin 34 to the blade rubber 17 will be described. The holder 13 is secured to the rail 31. Then, the fin sections 34a, 34b of the fin 34 are bonded to the left side and right side of the rail 31 in FIGS. 8A and 8B. Next, the distal ends of the claws 32 of the rail 31 are inserted into the holder grooves 21 of the blade rubber 17. Then, the blade rubber 17, into which the backing plates 22 are installed, is moved relative to the rail 31 in the longitudinal direction of the wiper blade 30, so that the blade rubber 17 is installed to the fin 34 and the holder 13.

Next, a way of removing the blade rubber 17 from the fin 34 will be described.

When the blade rubber 17 is moved relative to the rail 31 in the longitudinal direction of the wiper blade 30, the blade rubber 17 is removed from the fin 34.

Then, the blade rubber 17 is replaced with a new blade rubber 17. Thereafter, the blade rubber 17 is installed to the holder 13 and the rail 31 (the fin 18) in the manner described above.

The second embodiment provides the following advantages.

(1) The fin 34 is bonded to the resin rail 31 and is connected to the blade rubber 17 through the rail 31. That is, installation and removal of the blade rubber 17 can be achieved by moving the rail 31, to which the fin 34 is bonded, relative to the blade rubber 17 in the longitudinal direction of the wiper blade 30. Since the fin 34 is not bonded to the blade rubber 17, it is easy to replace the components of the wiper blade 30.

(2) The positioning portions 33 are formed in the rail 31. Thus, at the time of bonding the fin 34 to the rail 31, the fin 34 can be easily positioned relative to the rail 31, allowing easy installation of the fin 34 to the rail 31.

Third Embodiment

A third embodiment of the present invention will be described with reference to FIG. 11. In the present embodiment, components similar to those discussed in the first embodiment will be indicated by the same numerals and will not be described further.

Figure 11:
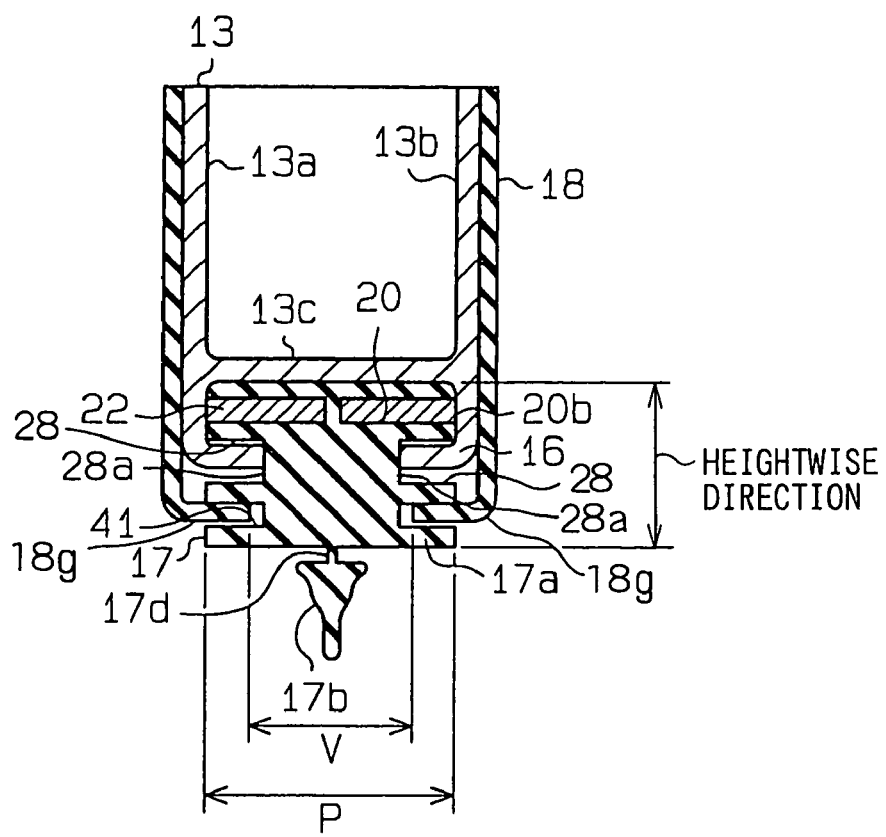
FIG. 11 is a cross sectional view of a wiper blade according to a third embodiment of the present invention.
Figure 12:
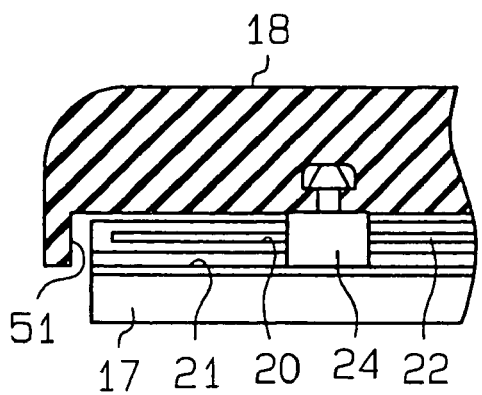
FIG. 12 is a partial cross sectional view showing a modification of the wiper blade.

With reference to FIG. 11, the blade rubber 17, to which the holder 13 is connected, is made of a rubber material and is elongated in the longitudinal direction of the wiper blade. Furthermore, the blade rubber 17 includes the connecting body 17a and the wiping lip 17b. The connecting body 17a includes the backing grooves 20, the holder grooves 28 and fin support grooves 41. The backing grooves (primary grooves) 20 are provided on the outer lateral surfaces 17c of the connecting body 17a. The holder grooves 28 serve as tertiary grooves. The fin support grooves 41 serve as secondary grooves. With this arrangement, a cross sectional area of the connecting body 17a is necked at three vertical points in FIG. 11.

The fin support grooves 41 extend along the blade rubber 17 in the longitudinal direction of the wiper blade. Furthermore, as shown in FIG. 11, the fin support grooves 41 are arranged on one side (lower side in FIG. 11) of the backing grooves 20 and of the holder grooves 28. The claws 18g of the fin 18 are shaped to conform with the shape of the fin support grooves 41 to allow insertion of the distal ends of the claws 18g into the fin support grooves 41. More specifically, as shown in FIG. 11, the distal ends of the claws 18g are bent to oppose one another at the position of the fin support grooves 41 in the heightwise direction of the wiper blade. A distance V between the distal ends of the claws 18g is smaller than the distance P (i.e., the distance measured in the transverse direction of the wiper blade 11) between the opposed outer lateral surfaces 17c of the connecting body 17a.

A way of installing the blade rubber 17 will be described.

The backing plates 22 are inserted into the backing grooves 20. Then, the blade rubber 17 is inserted to one end of the fin 18, to which the holder 13 and the support members 24 are secured, and is moved relative to the fin 18 in the longitudinal direction of the wiper blade.

At this time, the longitudinal end of the blade rubber 17 is moved relative to the fin 18 in the longitudinal direction of the wiper blade, so that the claws 16 of the holder 13 and the claws 25 of the support members 24 are inserted into the holder grooves 28, and the claws 18g of the fin 18 are inserted into the fin support grooves 41.

Then, the blade rubber 17 is moved further relative to the fin 18 in the longitudinal direction of the wiper blade until the More specifically, when the blade rubber 17 is moved while resiliently deforming the holding portions 23 of the blade rubber 17, resistance is created due to frictional force generated between the claws 18g and the holding portions 23. However, this does not occur in the third embodiment, and the blade rubber 17 can be more smoothly moved relative to the fin 18.

(2) The fin support grooves 41 are closest to the wiping lip 17b in the heightwise direction of the wiper blade among the three types of grooves, i.e., the backing grooves 20, the holder grooves 28 and the fin support grooves 41. More specifically, the holder grooves 28 are located between the backing grooves 20 and the fin support grooves 41. Thus, when the blade rubber 17 is connected to the fin 18, the holder 13 and the support members 24 can be completely covered by the fin 18. Further, as shown in FIG. 6, the support members 24 are fitted within a recess 18k formed in the fin 18. As a result, the wiper blade design shows the improved integrity.

The above embodiments can be modified as follows.

In the first embodiment, after installation of the blade rubber 17 to the fin 18, movement of the blade rubber 17 in the longitudinal direction of the wiper blade 11 relative to the holder 13 and the fin 18 is limited by the holding portions 23 formed in the holder grooves 21 of the blade rubber 17 to prevent inadvertent removal of the blade rubber 17. In place of the above structure, stopper walls 51, which limit the movement of the blade rubber 17 in the longitudinal direction of the wiper blade 11, can be provided integrally in the longitudinal ends of the fin 18. With this arrangement, when the blade rubber 17 tries to move in the longitudinal direction of the wiper blade 11, the corresponding end of the blade rubber 17 engages the stopper wall 51 to prevent inadvertent removal of the blade rubber 17 relative to the holder 13 and the fin member 18 without requiring the holding portions 23. Furthermore, at the time of installing or removing the blade rubber 17 relative to the holder 13 and the fin 18, the stopper wall 51, which is formed in one end of the fin 18, is outwardly deformed in the longitudinal direction to avoid contact with the corresponding end of the blade rubber 17. Thus, it is possible to move the blade rubber 17 relative to the fin 18 in the longitudinal direction of the wiper blade. As a result, replacement of components is eased.

The distal end shape of the wiper arm 12 and the structure of the holder 13 are not limited to those discussed above and can be modified in any appropriate manner.

In the first embodiment, each of the holding portions 23, which engage the claws 16 of the holder 13, is formed in the base 21a of the corresponding holder groove 21. However, the position of each holding portion 23 is not limited to this base 21a. As long as the holding portion 23 is located in the corresponding holder groove 21, the holding portion 23 can be placed at any position in the corresponding holder groove 21. Furthermore, each holding portion 23 is not limited to the one that engages with the claw 16 of the holder 13. That is, each holding portion 23 can be provided at any other appropriate position, at which the holding portion 23 can engage with the holder 13 to limit the movement of the blade rubber 17 relative to the holder 13. For example, each holding portion 23 can be provided in a top surface holding portions 23 of the connecting body 17a are engaged with the holder 13. That is, the blade rubber 17 is moved relative to the fin 18 in the longitudinal direction of the wiper blade to connect the fin 18 to the blade rubber 17 until the longitudinal center of the fin 18 is placed over the longitudinal center of the blade rubber 17.

At the time of removing the blade rubber 17 from the fin 18, pressure is applied to the blade rubber 17 in the longitudinal direction of the wiper blade at one end of the fin 18, so that the claws 18g of the fin 18 are removed from the fin support grooves 41, and the claws 25 of the support members 24 and the claws 16 of the holder 13 are removed from the holder grooves 28. Thus, the claws 16 of the holder 13 and the claws 25 of the support members 24 are moved beyond the holding portions 23, and the blade rubber 17 can move relative to the fin 18, the support members 24 and the holder 13 in the longitudinal direction of the wiper blade 11. In this way, the blade rubber 17 and the backing plates 22 can be removed from the fin 18.

The third embodiment of the present invention provides the following advantages.

(1) The fin support grooves 41, which receive the claws 18g of the fin 18, are formed in the connecting body 17a separately from the holder grooves 28, in which the holding portions 23 are formed. Thus, when the blade rubber 17 is moved relative to the fin 18 in the longitudinal direction of the wiper blade, the holding portions 23 do not contact the claws 18g of the fin 18, and thus the movement of the blade rubber 17 is not interrupted. of the connecting body 17a of the blade rubber 17 to engage with the plate portion 13c of the holder 13.

In the first to third embodiments, the blade rubber 17 is made of the rubber material. However, the material of the blade rubber 17 is not limited to the rubber material and can be any other appropriate material, which can be resiliently deformed.

In the first to third embodiments, the fin 18 is made of the rubber material. However, the material of the fin 18 is not limited to the rubber material and can be any other appropriate material, which can be resiliently deformed.

In the first and third embodiments, the support members 24 are connected to the fin 18. However, the support members 24 can be eliminated if appropriate.

In the second embodiment, the claws 32 of the rail 31 are fitted into the holder grooves 21. Alternatively, fin support grooves can be formed in the connecting body 17a on one side of the backing grooves 20 where the wiping lip 17b is arranged, and the claws 32 of the rail 31 can be fitted into the fin support grooves of the connecting body 17a.

In the second embodiment, the rail 31 can be divided into two parts at the longitudinal center of the rail 31. The rails can be installed to the opposed ends, respectively, of the blade rubber 17 and can be moved relative to the blade rubber 17 in the longitudinal direction to connect the fin 34 to the blade rubber 17.

In the second embodiment, the positioning portions 33 are formed in the rail 31. However, the positioning portions 33 are only used to define the connecting position of the fin 34 relative to the rail 31 and thus can be eliminated.

In the second embodiment, the positioning portion 33 are formed in the rail 31 to position the fin 34 relative to the rail 31. Similar to the first embodiment, engaging protrusions, which are engaged with corresponding engaging holes of the fin 34 to connect the fin 34 to the rail 31, can be formed in the rail 31. In this way, it is not required to bond the fin 34 to the rail 31, and the fin 34 can be easily removed from the rail 31.

In the second embodiment, the fin 34 is divided into the two fin sections 34a, 34b, which are arranged on the opposite sides of the holder 13. Alternatively, the fin 34 can be formed as a single body by providing a cover portion, which covers the outer lateral surfaces of the holder 13 and connects between the fin sections.

Additional advantages and modifications will readily occur to those skilled in the art. The invention in its broader terms is therefore not limited to the specific details, representative apparatus, and illustrative examples shown and described.

What is claimed is:

1. A wiper blade for a wiper system that wipes a wiping surface of a vehicle and includes a wiper arm rotatably connected to the wiper blade, the wiper blade comprising:
   a blade rubber that wipes the wiping surface and includes two primary grooves, wherein the primary grooves extend in a first direction parallel to a central axis of the wiper blade and are arranged in first and second lateral sides, respectively, of the blade rubber that are opposed to one another in a second direction perpendicular to the first direction and generally parallel to the wiping surface, wherein the blade rubber further includes a wiping lip that wipes the wiping surface and a connecting body that is connected to the holder and includes the primary grooves;
   two backing plates that extend in the first direction and are received in the primary grooves, respectively, of the blade rubber;
   a holder that is rotatably connected to the wiper arm and detachably holds the blade rubber, which has the backing plates; and
   a resilient fin that extends in the first direction and is connected to the holder, wherein the fin limits lifting of the wiper blade from the wiping surface when the vehicle is running, wherein
   the fin includes two claws that cooperate together to clamp the connecting body of the blade rubber;
   the connecting body further includes two secondary grooves, which extend in the first direction and are arranged in the first and second lateral sides, respectively, of the blade rubber;
   the secondary grooves receive the claws, respectively, of the fin;
   the holder includes at least one pair of claws;
   the connecting body further includes two tertiary grooves, which extend in the first direction and are arranged in the first and second lateral sides, respectively, of the blade rubber;
   the tertiary grooves receive the claws, respectively, of each pair of the holder; and
   the tertiary grooves are positioned between the primary grooves and the wiping lip.

2. A wiper blade for a wiper system that wipes a wiping surface of a vehicle and includes a wiper arm rotatably connected to the wiper blade, the wiper blade comprising:
   a blade rubber that wipes the wiping surface and includes two primary grooves, wherein the primary grooves extend in a first direction parallel to a central axis of the wiper blade and are arranged in first and second lateral sides, respectively, of the blade rubber that are opposed to one another in a second direction perpendicular to the first direction and generally parallel to the wiping surface;
   two backing plates that extend in the first direction and are received in the primary grooves, respectively, of the blade rubber;

a holder that is rotatably connected to the wiper arm and detachably holds the blade rubber, which has the backing plates; and a resilient fin that extends in the first direction and is connected to the holder, wherein the fin limits lifting of the wiper blade from the wiping surface when the vehicle is running, the holder includes at least one engaging protrusion;

the fin includes at least one engaging hole, which respectively receives the at least one engaging protrusion of the holder; and each engaging protrusion of the holder includes an anchoring projection, which projects away from the rest of the engaging protrusion and resists removal of the engaging protrusion from a corresponding one of the at least one engaging hole of the fin.

3. A wiper blade for a wiper system that wipes a wiping surface of a vehicle and includes a wiper arm rotatably connected to the wiper blade, the wiper blade comprising:

a blade rubber that wipes the wiping surface and includes two primary grooves, wherein the primary grooves extend in a first direction parallel to a central axis of the wiper blade and are arranged in first and second lateral sides, respectively, of the blade rubber that are opposed to one another in a second direction perpendicular to the first direction and generally parallel to the wiping surface;

two backing plates that extend in the first direction and are received in the primary grooves, respectively, of the blade rubber;

a holder that is rotatably connected to the wiper arm and detachably holds the blade rubber, which has the backing plates; and a resilient fin that extends in the first direction and is connected to the holder, wherein the fin limits lifting of the wiper blade from the wiping surface when the vehicle is running;

at least one support member that detachably holds the blade rubber and the backing plates and is connected to the fin, wherein the at least one support member is spaced from the holder in the first direction, wherein the blade rubber and the backing plates are free to move in the first direction with respect to the support member to permit installation and removal of the blade rubber, and wherein the support member is fitted within a recess formed in the fin.

4. The wiper blade according to claim 3, wherein: the blade rubber further includes: a wiping lip that wipes the wiping surface; and a connecting body that is connected to the holder and includes the primary grooves; and the fin includes two claws that cooperate together to clamp the connecting body of the blade rubber.

5. The wiper blade according to claim 4, wherein: the connecting body further includes two secondary grooves, which extend in the first direction and are arranged in the first and second lateral sides, respectively, of the blade rubber; and the secondary grooves receive the claws, respectively, of the fin.

6. The wiper blade according to claim 5, wherein: the holder includes at least one pair of claws; and the secondary grooves further receive the claws, respectively, of each pair of the holder.

7. The wiper blade according to claim 6, wherein the blade rubber includes at least one holding portion that engages with the holder to limit movement of the holder in the first direction.

8. The wiper blade according to claim 7, wherein the at least one holding portion of the blade rubber is provided in at least one of the secondary grooves.

9. The wiper blade according to claim 7, wherein the at least one holding portion of the blade rubber holds the holder at a longitudinal center of the blade rubber.

10. The wiper blade according to claim 7, wherein: each holding portion of the blade rubber has a slope; a distance between the holder and a first end of the slope of each holding portion is smaller than a distance between the holder and a second end of the slope of the holding portion; and a distance between a central axis of the blade rubber and the first end of the slope of each holding portion is greater than a distance between the central axis of the blade rubber and the second end of the slope of the holding portion.

11. The wiper blade according to claim 7, wherein: the at least one pair of claws of the holder includes first and second pairs of claws; the first pair of claws is spaced from the second pair of claws in the first direction; the at least one holding portion includes first and second pairs of holding portions; the holding portions of each pair are provided in the secondary grooves, respectively; and the first pair of holding portions is spaced from the second pair of holding portions in the first direction, such that the first and second pairs of claws are positioned between the first pair of holding portions and the second pair of holding portions.

12. The wiper blade according to claim 3, wherein an opening of each primary groove is covered by the fin.

13. The wiper blade according to claim 3, wherein: the holder includes at least one engaging protrusion; and the fin includes at least one engaging hole, which respectively receives the at least one engaging protrusion of the holder.

14. The wiper blade according to claim 13, wherein the at least one engaging hole of the fin and the at least one engaging protrusion of the holder are engaged one another in a third direction, which is generally perpendicular to the wiping surface.

15. The wiper blade according to claim 3, wherein the fin further includes two stopper walls, which are provided at longitudinal ends, respectively, of the fin to engage with longitudinal ends of the blade rubber.

16. The wiper blade according to claim 3, wherein the fin further includes: two fin sections that are arranged on opposite sides, respectively, of the holder in the first direction; and a cover portion that covers opposed lateral walls of the holder and connects between the fin-sections.

17. The wiper blade according to claim 3, wherein: each support member includes an engaging protrusion; and the fin further includes at least one connecting hole, each of which receives the engaging protrusion of a corresponding one of the at least one support member to connect between the fin and the corresponding support member.

18. The wiper blade according to claim 3, further comprising a resilient holding member, which extends in the first direction and at least partially overlaps with the holder, wherein the holding member detachably holds the blade rubber and the backing plates and is connected to the fin.

19. The wiper blade according to claim 3, wherein the backing plates are received entirely within the primary grooves and do not substantially project from the primary grooves.

20. The wiper blade according to claim 3, wherein the support member includes a pair of opposed claws; and the secondary grooves receive the opposed claws of the support member, respectively.

21. A wiper system that wipes a wiping surface of a vehicle, the wiper system comprising:

a wiper arm;

a wiper blade that is rotatably connected to the wiper arm, wherein the wiper blade includes a blade rubber that wipes the wiping surface and two primary grooves, wherein the primary grooves extend in a first direction parallel to a central axis of the wiper blade and are arranged in first and second lateral sides, respectively, of the blade rubber that are opposed to one another in a second direction perpendicular to the first direction and generally parallel to the wiping surface;

two backing plates that extend in the first direction and are received in the primary grooves, respectively, of the blade rubber;

a holder that is rotatably connected to the wiper arm and detachably holds the blade rubber, which has the backing plates; and a resilient fin that extends in the first direction and is connected to the holder, wherein the fin limits lifting of the wiper blade from the wiping surface when the vehicle is running; and at least one support member that detachably holds the blade rubber and the backing plates and is connected to the fin, wherein the at least one support member is spaced from the holder in the first direction, wherein the blade rubber and the backing plates are free to move in the first direction with respect to the support member to permit installation and removal of the blade rubber, wherein the support member is fitted within a recess formed in the fin.

22. The wiper blade according to claim 21, wherein the backing plates are received entirely within the primary grooves and do not substantially project from the primary grooves.

23. The wiper blade according to claim 21, wherein the support member includes a pair of opposed claws; and the secondary grooves receive the opposed claws of the support member, respectively.

* * * * *